(12) United States Patent
Brandl et al.

(10) Patent No.: US 11,572,792 B2
(45) Date of Patent: Feb. 7, 2023

(54) AIRFOIL WITH A SQUEALER TIP COOLING SYSTEM FOR A TURBINE BLADE, A TURBINE BLADE, A TURBINE BLADE ASSEMBLY, A GAS TURBINE AND A MANUFACTURING METHOD

(71) Applicant: DOOSAN ENERBILITY CO., LTD., Changwon-si (KR)

(72) Inventors: Herbert Brandl, Baden (CH); Joerg Krueckels, Baden (CH); Ulrich Rathmann, Baden (CH); Willy H Hofmann, Baden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/534,352

(22) Filed: Nov. 23, 2021

(65) Prior Publication Data
US 2022/0243597 A1 Aug. 4, 2022

(30) Foreign Application Priority Data
Feb. 4, 2021 (EP) .................................... 21155254

(51) Int. Cl.
*F02C 7/18* (2006.01)
*F01D 5/18* (2006.01)

(52) U.S. Cl.
CPC .................. *F01D 5/18* (2013.01); *F02C 7/18* (2013.01); *F05D 2220/32* (2013.01);
(Continued)

(58) Field of Classification Search
CPC .......... F01D 5/18; F02C 7/18; F05D 2220/32; F05D 2230/60; F05D 2240/307; F05D 2260/201
See application file for complete search history.

(56) References Cited

U.S. PATENT DOCUMENTS 4,487,550 A * 12/1984 Horvath .................... F01D 5/20
416/97 A
5,192,192 A * 3/1993 Ourhaan .................... F01D 5/18
415/115
(Continued)

FOREIGN PATENT DOCUMENTS

EP 3043025 A1 * 7/2016 ............. F01D 11/10
EP 3575555 A1 4/2019
(Continued)

OTHER PUBLICATIONS

European Patent Office Search Report dated Jul. 19, 2021.

*Primary Examiner* — Igor Kershteyn
*Assistant Examiner* — Theodore C Ribadeneyra
(74) *Attorney, Agent, or Firm* — Harvest IP Law LLP

(57) ABSTRACT

The present invention provides an airfoil 110 with the squealer tip cooling system 50 for a turbine blade 100 at the blade tip 113, wherein the squealer tip cooling system 50 comprises a cooling passage 170 arranged within a squealer tip 117, wherein the cooling passage 170 at least partly extends toward a terminal end 74 of the squealer tip 117, and a pocket 172 at a lateral surface 75, 76 of the squealer tip 117, open externally and extending inwardly at least partly across the cooling passage 170. The pocket 172 intersects the cooling passage 170 and the pocket 172 comprises an impingement surface 70 facing the cooling passage 170, on which a cooling medium expelled through the cooling passage 170 impinges before being discharged externally through the pocket 172.

18 Claims, 12 Drawing Sheets

(52) U.S. Cl.
CPC .... *F05D 2230/60* (2013.01); *F05D 2240/307* (2013.01); *F05D 2260/201* (2013.01)

(56) References Cited

U.S. PATENT DOCUMENTS

| | | | | |
|---|---|---|---|---|
| 5,282,721 | A * | 2/1994 | Kildea | F01D 11/10 415/173.1 |
| 6,916,150 | B2 * | 7/2005 | Liang | F01D 5/186 415/115 |
| 6,971,851 | B2 * | 12/2005 | Liang | F01D 5/08 416/97 R |
| 7,249,934 | B2 * | 7/2007 | Palmer | F01D 5/186 416/97 R |
| 7,704,045 | B1 * | 4/2010 | Liang | F01D 5/20 416/228 |
| 7,845,908 | B1 * | 12/2010 | Liang | F01D 5/187 416/97 R |
| 7,997,865 | B1 * | 8/2011 | Liang | F01D 11/00 416/92 |
| 8,066,485 | B1 * | 11/2011 | Liang | F01D 5/20 416/93 R |
| 8,092,178 | B2 * | 1/2012 | Marini | F01D 5/20 416/97 R |
| 8,157,505 | B2 * | 4/2012 | Liang | F01D 5/187 415/173.1 |
| 8,172,507 | B2 * | 5/2012 | Liang | F01D 11/08 415/173.1 |
| 8,366,394 | B1 * | 2/2013 | Liang | F01D 5/187 415/115 |
| 8,414,265 | B2 * | 4/2013 | Willett, Jr. | F01D 5/145 416/228 |
| 9,249,670 | B2 * | 2/2016 | Bunker | F01D 5/186 |
| 9,273,561 | B2 * | 3/2016 | Lacy | F01D 5/186 |
| 9,297,262 | B2 * | 3/2016 | Zhang | F01D 5/186 |
| 9,470,096 | B2 * | 10/2016 | Mishra | F01D 5/186 |
| 9,856,739 | B2 * | 1/2018 | Bedrosyan | F01D 5/187 |
| 9,879,544 | B2 * | 1/2018 | Waldman | F01D 5/18 |
| 10,400,608 | B2 * | 9/2019 | Coomer | F01D 5/20 |
| 10,436,038 | B2 * | 10/2019 | Buhler | F01D 5/20 |
| 10,605,098 | B2 * | 3/2020 | Dyson | F01D 5/187 |
| 10,704,406 | B2 * | 7/2020 | Walunj | F01D 5/18 |
| 10,711,618 | B2 * | 7/2020 | Mongillo | F01D 5/20 |
| 10,753,207 | B2 * | 8/2020 | Rathay | F01D 5/186 |
| 10,774,658 | B2 * | 9/2020 | Kester | B33Y 80/00 |
| 10,830,057 | B2 * | 11/2020 | Beyer | F01D 5/20 |
| 10,890,075 | B2 * | 1/2021 | Jung | F01D 5/186 |
| 10,982,553 | B2 * | 4/2021 | Rathay | F01D 5/20 |
| 11,015,453 | B2 * | 5/2021 | Smith | F04D 29/324 |
| 11,208,902 | B2 * | 12/2021 | Honkomp | F01D 5/188 |
| 2002/0182074 | A1 * | 12/2002 | Bunker | F01D 5/18 416/97 R |
| 2002/0197160 | A1 * | 12/2002 | Liang | F01D 5/18 416/224 |
| 2013/0298400 | A1 * | 11/2013 | Munshi | F01D 11/14 29/889.1 |
| 2013/0302166 | A1 * | 11/2013 | Lee | F01D 11/14 228/119 |
| 2014/0178207 | A1 * | 6/2014 | He | F01D 11/08 416/182 |
| 2015/0159488 | A1 * | 6/2015 | Lehmann | F01D 5/20 416/97 R |
| 2016/0258301 | A1 * | 9/2016 | Chouhan | F02C 3/04 |
| 2017/0058680 | A1 * | 3/2017 | Chouhan | F01D 5/18 |
| 2018/0216471 | A1 * | 8/2018 | Rathay | F01D 5/18 |
| 2018/0230826 | A1 * | 8/2018 | Vetters | F01D 11/008 |
| 2019/0032496 | A1 * | 1/2019 | Kester | F01D 11/08 |
| 2019/0063250 | A1 * | 2/2019 | Shi | F01D 5/28 |
| 2019/0338650 | A1 * | 11/2019 | Henderkott | F01D 11/122 |
| 2020/0102836 | A1 * | 4/2020 | Kim | F01D 11/10 |

FOREIGN PATENT DOCUMENTS

| | | | |
|---|---|---|---|
| WO | 2015069411 | A1 | 5/2015 |
| WO | WO-2019035802 | A1 * | 2/2019 ............ B62D 1/181 |

* cited by examiner

AIRFOIL WITH A SQUEALER TIP COOLING SYSTEM FOR A TURBINE BLADE, A TURBINE BLADE, A TURBINE BLADE ASSEMBLY, A GAS TURBINE AND A MANUFACTURING METHOD

CROSS-REFERENCE TO RELATED APPLICATIONS

This application claims priority to European Patent Application No. 21155254.2, filed on Feb. 4, 2021, the disclosure of which is incorporated herein by reference in its entirety.

FIELD OF THE INVENTION

The present invention relates to an airfoil with a squealer tip cooling system for a turbine blade, a turbine blade, a turbine blade assembly, a gas turbine, and a manufacturing method for the airfoil with the squealer tip cooling system.

BACKGROUND OF INVENTION

Airfoils of turbine blades—particularly blade tips—are exposed to high temperature during operation. Therefore, blade tips comprise cooling holes which lead cooling air from a blade cavity in direction to the blade tip or more precisely to a squealer tip to reduce its temperature.

Since the squealer tip may be continuously in contact with hot combustion products, such as hot gases, a cooling of the squealer tip is desired at the suction side surface and/or the pressure side surface of the airfoil. However, since the squealer tip is disposed to face a stator surface very closely, an undesired event of contact between the squealer tip and the facing stator surface may occur during operation of the gas turbine—known as rub event. Consequently, the cooling air cannot exit the cooling hole in a radially outward direction of the squealer tip.

Therefore, there is a need to provide an airfoil with a squealer tip cooling system which may provide an efficient cooling of the squealer tip of a turbine blade even in case of a rub event.

SUMMARY

The disclosure provides an airfoil with a squealer tip cooling system for a turbine blade, a turbine blade, a turbine blade assembly, a gas turbine, and a manufacturing method for the airfoil with the squealer tip cooling system.

According to one aspect of the present disclosure, an airfoil with a squealer tip cooling system for a turbine blade is disclosed, wherein the airfoil comprises a squealer tip cooling system provided at a blade tip, wherein the squealer tip cooling system comprises a cooling passage arranged within a squealer tip, wherein the cooling passage at least partly extends toward a terminal end of the squealer tip, and a pocket provided at a lateral surface of the squealer tip, open externally and extending inwardly at least partly across the cooling passage, and wherein the pocket intersects the cooling passage and includes an impingement surface facing the cooling passage, on which a cooling medium expelled through the cooling passage impinges before being discharged externally through the pocket is disclosed.

The manufacturing method of the airfoil with the squealer tip cooling system comprises the steps A1, A2 and A3. In step A1 at least a part of a cooling passage is allocated within a blade tip of the airfoil. In step A2 the remaining part of the cooling passage is provided such that the cooling passage at least partly extends within a squealer tip toward a terminal end of the squealer tip. In step A3 a pocket is provided at a lateral surface of the squealer tip such that the pocket intersects the cooling passage, wherein the pocket comprises an impingement surface facing the cooling passage, such that a cooling medium expelled through the cooling passage impinges on the impingement surface before being discharged externally through the pocket.

The airfoil with the squealer tip cooling system may comprise the suction side surface and the pressure side surface, wherein the suction side surface and the pressure side surface meet at the leading edge and the trailing edge. The airfoil may comprise the squealer tip cooling system provided at the blade tip. The suction side surface, the pressure side surface with the leading edge and the trailing edge may define an internal space of the airfoil.

The squealer tip cooling system comprises the cooling passage, wherein the cooling passage at least partly extends within the squealer tip. The cooling passage may have any cross-sectional shape or geometry, such as ring shaped, circular, elliptical, square, or rectangular. A hydraulic diameter may be adapted according to the cross-sectional shape or geometry of the cooling passage. The hydraulic diameter may be a preset hydraulic diameter. The cooling passage may comprise an inlet, wherein the inlet may be positioned in a blade cavity of the turbine blade. The squealer tip may also be understood as a squealer tip rail or squealer rail.

The squealer tip cooling system further comprises the pocket provided at the lateral surface of the squealer tip, open externally and extending inwardly at least partly across the cooling passage. The pocket described herein may also be a recess, an open cavity, a slot, or a hole which in general can be understood as a machined, drilled, or milled cavity or recess manufactured on the lateral surface of the squealer tip where simultaneously the cooling passage of the squealer tip is allocated.

The pocket of the squealer tip intersects the cooling passage and comprises the impingement surface facing the cooling passage, on which a cooling medium expelled through the cooling passage impinges before being discharged externally through the pocket. The cooling medium may be a cooling gas or a cooling liquid. The cooling passage may further comprise an outlet, wherein the outlet intersects the pocket of the squealer tip cooling system. The cooling passage therefore comprises the inlet located in the cavity and the outlet which may lead the cooling medium to the pocket where the cooling medium impinges inter alia on the impingement surface. That is, the cooling medium enters the inlet, passes the cooling passage, and exits the cooling passage via the outlet before it impinges the impingement surface to thereby cool the squealer tip and then exits the pocket. During impingement of the cooling medium on the impingement surface higher heat transfer may be particularly realized.

Based on the squealer tip cooling system disclosed herein, an impingement cooling may be realized in an easy and efficient manner. Therefore, a lower temperature at the squealer tip could be achieved with simultaneously substantially unchanged turbine blade stage efficiency. In this context with the term "unchanged" is meant that by using or implementing the herein described squealer tip cooling system the turbine blade stage efficiency is not influenced in a negative way. Thus, an efficient cooling of the airfoil may be realized, while the turbine blade stage efficiency may substantially remain constant. That is, based on the squealer tip cooling system described herein, a lower temperature may be achieved with a same amount of cooling medium in comparison to a conventional cooling system.

According to a further aspect of the present disclosure a turbine blade with the airfoil with the squealer tip cooling system described herein is disclosed, wherein the turbine blade comprises the blade cavity therein through which the cooling medium enters the cooling passage.

According to a further aspect of the present disclosure a turbine blade assembly is disclosed. The turbine blade assembly comprises a plurality of the turbine blades described herein and a rotor disk to which said plurality of the turbine blades is coupled, connected, or attached.

According to a further aspect of the present disclosure a gas turbine comprising the turbine blade assembly described herein is disclosed.

Further embodiments of the present disclosure are subject of the further subclaims and the following description, referring to the drawings.

According to an embodiment the airfoil may comprise a plurality of the squealer tip cooling system at least partly at the suction side surface and/or the pressure side surface of the airfoil. Therefore, an efficient cooling of the airfoil may be realized.

According to a further embodiment the airfoil may comprise a plurality of the squealer tip cooling system throughout at least at the suction side surface and/or the pressure side surface of the airfoil. Particularly a lower temperature at the squealer tip on the suction side surface may be achieved.

According to a further embodiment the pocket comprises a larger spatial expansion than the outlet of the cooling passage. Therefore, the cooling may be realized in an efficient manner and the pocked can be easily implemented or provided at the lateral surface of the squealer tip.

According to a further embodiment the pocket has at least partly a rectangular, a semicircular, an elliptical or a circular shape, wherein the impingement surface is located opposite to the cooling passage. Therefore, the cooling may be realized in an efficient manner and the pocket can be easily implemented or provided at the lateral surface of the squealer tip.

According to a further embodiment the pocket is provided at an outer lateral surface of the squealer tip, open outwardly of the airfoil. The outer lateral surface of the squealer tip may be on the same side as the suction side surface of the airfoil.

According to a further embodiment the pocket is provided at an inner lateral surface of the squealer tip, open inwardly of the airfoil. The inner lateral surface of the squealer tip may be positioned opposite to the outer lateral surface of the squealer tip that is assigned to the suction side surface or the pressure side surface, accordingly. The inner lateral surface and the outer lateral surface of the squealer tip have between them the terminal end of the squealer tip in common.

According to a further embodiment an intersection of the pocket and the cooling passage is positioned away from boundaries of the pocket. For example, the intersection of the pocket and the cooling passage may be positioned at a center of the pocket. Alternatively, the intersection may be located at any position within the pocket or the intersection may be at least partly located within the pocket.

According to a further embodiment the cooling passage extends obliquely with respect to the suction and/or pressure side surface. The cooling passage may therefore be easily implemented in the squealer tip and the blade tip, accordingly.

According to a further embodiment the cooling passage extends up to the terminal end of the squealer tip to be opened outside in a radially outward direction, wherein the cooling passage runs at least partly through the pocket, and wherein the impingement surface comprises at least partly a sealing element configured to seal the cooling passage. In other words, the cooling passage may be open and the terminal end of the squealer tip may comprise an opening of the cooling passage.

According to a further embodiment the cooling passage may be a through-hole which extends form the inlet located in the blade cavity to the outlet, wherein the opening of the cooling passage is located at the terminal end of the squealer tip. The cooling passage may at least partly cross and intersect the pocket. The cooling passage may also fully pass through and intersect the cooling pocket.

The sealing element may be a locking element, a closing element, or a plug. The impingement surface may at least partly comprise a bottom surface of the sealing element. The sealing element may comprise a material or material composition which may have a similar or higher heat transfer during impingement of the cooling medium on the impingement surface.

According to a further embodiment the sealing element is brazed or welded into the terminal end of the squealer tip. Therefore, the sealing element may be easily implemented, introduced, or plugged into the cooling passage of the squealer tip cooling system.

According to a further embodiment the sealing element comprises an inelastic end, wherein the inelastic end comprises a single fixing mean or a plurality of fixing means (e.g., two, three or four fixing means) spaced apart from each other. Therefore, the sealing element may be in an easy way mechanically implemented, introduced, or plugged into the cooling passage of the squealer tip cooling system, and subsequently locked with the cooling passage (e.g., by interlocking with the pocket).

According to a further embodiment the terminal end of the squealer tip is at least partly machined. For example, the terminal end of the squealer tip may be drilled out such that an insertion of the sealing element may be facilitated.

According to a further embodiment the squealer tip cooling system may be manufactured by means of additive manufacturing. Therefore, the squealer tip cooling system may be arranged on the blade tip, having the corresponding cooling passages aligned with each other. Alternatively, the squealer tip cooling system with the blade tip may be manufactured my means of the additive manufacturing, wherein an alignment of the corresponding cooling passages and an adjustment on the blade tip may not be necessary.

The features described herein with respect to the airfoil with the squealer tip cooling system are also disclosed for the manufacturing method of the corresponding airfoil with the squealer tip cooling system and vice versa.

BRIEF DESCRIPTION OF THE DRAWIGNS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs and numerals denote like elements unless stated otherwise.

DETAILED DESCRIPTION OF THE DRAWINGS

Figure 1:
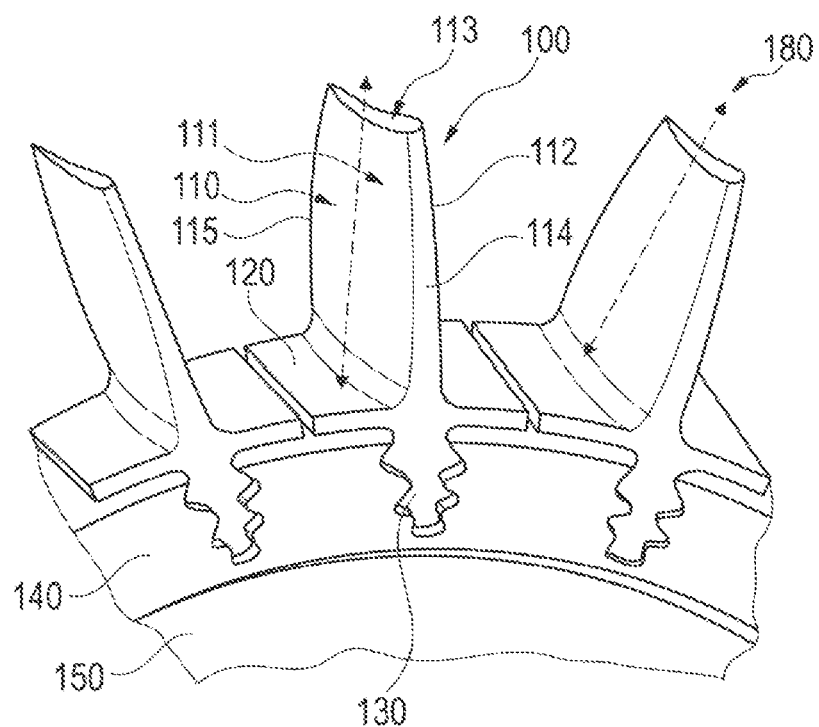
FIG. 1 shows a schematic illustration of an embodiment of a turbine blade assembly in which an embodiment of a turbine blade comprising an airfoil with a squealer tip cooling system may be incorporated according to the present invention.

FIG. 1 shows a schematic illustration of an embodiment of a turbine blade assembly in which an embodiment of a turbine blade comprising an airfoil with a squealer tip cooling system may be incorporated according to the present invention.

Referring to FIG. 1, a turbine blade assembly 180 comprises a rotor disk 140 which is placed coaxially around a shaft 150 and integrally connected to the shaft 150. When the rotor disk 140 is moved in rotation, the shaft 150 is also moved in rotation correspondingly on their common rotation axis. The turbine blade assembly 180 further comprises a plurality of turbine blades 100 around the circumference of the rotor disc 140. Each blade extends from a root 130 connected to the rotor disk 140. The turbine blades 100 may comprise platforms 120 on the side of the root 130. Each platform 120 may be substantially parallel to the circumference of the rotor disc 140. On the platform 120 is disposed an airfoil 110. The airfoil may comprise a suction side surface 111 on a side surface which may be convex. The airfoil 110 may comprise a pressure side surface 112 which may be a concave surface. The airfoil may comprise a blade tip 113 opposite to the root 130. The airfoil may further comprise a leading edge 114 and a trailing edge 115. The suction side surface 111 and the pressure side surface 112 meet at the leading edge 114 and the trailing edge 115.

The turbine blade assembly 180 comprises a plurality of the turbine blades 100 being attached to the rotor disk 140.

Figure 2:
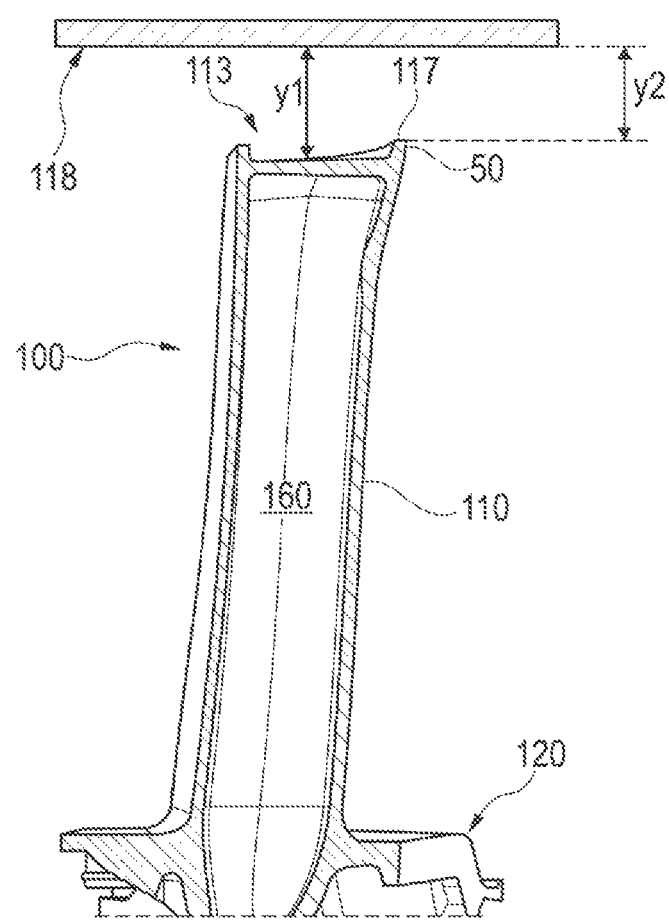
FIG. 2 shows a schematic cross-sectional illustration of an embodiment of the turbine blade comprising an airfoil with the squealer tip cooling system according to the present invention.

FIG. 2 shows a schematic cross-sectional illustration of an embodiment of the turbine blade comprising the airfoil with the squealer tip cooling system according to the present invention.

FIG. 2 is the schematic cross-sectional illustration in a cut plane being defined by the dotted double arrow and the circumferential direction of FIG. 1. The turbine blade 100 particularly comprises the airfoil 110, a blade cavity 160 within the airfoil 110, and the platform 120. The blade tip 113 may comprise a squealer tip 117, wherein the blade tip 113 and the squealer tip 117 face a stator surface 118. In this context it is noted that the squealer tip 117 may be an extension of the airfoil 110 and may have the suction side surface 111 and the pressure side surface 112, wherein the suction side surface 111 and the pressure side surface 112 meet each other at the leading edge 114 and the trailing edge 115. The squealer tip 117 may comprise a squealer tip cooling system 50.

As illustrated in FIG. 2 a radial clearance y2 between the stator surface 118 and the squealer tip 117 may be smaller than a radial clearance y1 between the stator surface 118 and a part of the blade tip 113 without the squealer tip 117.

Figure 3:
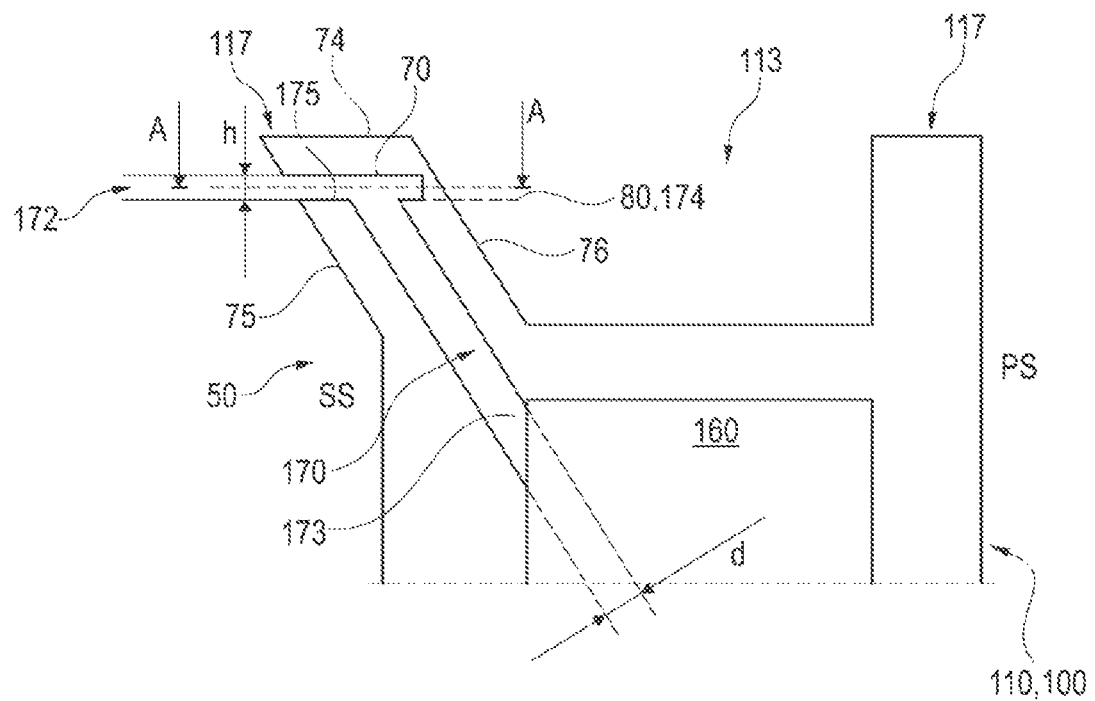
FIG. 3 shows a schematic cross-sectional illustration of an embodiment of the airfoil with the squealer tip cooling system provided at a blade tip according to the present invention.

FIG. 3 shows a schematic cross-sectional illustration of an embodiment of the airfoil with the squealer tip cooling system provided at a blade tip according to the present invention.

The airfoil 110 with the squealer tip cooling system 50 for a turbine blade 100 may be provided at the blade tip 113. The squealer tip cooling system 50 may comprise a cooling passage 170 with a hydraulic diameter d arranged within a squealer tip 117. The cooling passage 170 at least partly extends toward a terminal end 74 of the squealer tip 117. That is, the cooling passage 170 of FIG. 3 may extend within the squealer tip 117 either up to the terminal end 74 of the squealer tip 117 or it may terminate before reaching the terminal end 74.

As shown in FIG. 3 a pocket 172 may be provided at an outer lateral surface 75 of the squealer tip 117, open at the outer lateral surface 75 and extending inwardly at least partly across the cooling passage 170. In other words, the cooling passage 170 and the pocket 172 may comprise a common intersection 80 such that the pocket 172 intersects the cooling passage 170. The pocket 172 comprises an impingement surface 70 facing the cooling passage 170, on which a cooling medium expelled through the cooling passage 170 impinges before being discharged externally through the pocket 172.

The squealer tip 117 on the suction side SS and the squealer tip 117 on the pressure side PS may surround the blade tip 113. The squealer tip 117 on the suction side SS may comprise an outer lateral surface 75 and an inner lateral surface 76, wherein the inner lateral surface 76 may be opposite to the outer lateral surface 75 and the two lateral surfaces 75, 76 may have between them the terminal end 74 of the squealer tip 117 in common.

The cooling passage may comprise an inlet 173 located in the blade cavity 160. The cooling passage 170 may further comprise an outlet 174, wherein the outlet 174 intersects the pocket 172 at the common intersection 80. The outlet 174 may lead the cooling medium to the pocket 172, during which the cooling medium impinges inter alia on the impingement surface 70. That is, the cooling medium may enter the inlet 173, passes the cooling passage 170, exits the cooling passage via the outlet 174, and impinges the impingements surface 70 to thereby cool the squealer tip 117 and then exits the pocket 172. During impingement of the cooling medium on the impingement surface 70 higher heat transfer may particularly occur.

In FIG. 3 the pocket 172 is provided at the outer lateral surface 75 of the squealer tip 117, open outwardly of the airfoil 110.

The pocket 172 may comprise a height h defined as a distance between a bottom surface 175 of the pocket 172 and the impingement surface 70 of the pocket 172. The bottom surface 175 of the pocket 172 may also be understood as a surface which comprises the outlet 174 of the cooling passage 170, and/or the intersection 80 of the cooling passage 170 with the pocket 172. The height h may be between 1 and 3 times bigger than the hydraulic diameter d. Preferably the height h may be between 1 and 2.5 times bigger than the hydraulic diameter d. Most preferably the height h may be between 1 and 2 times bigger than the hydraulic diameter d. The cooling passage 170 may extend obliquely with respect to the suction side SS surface 111 and/or the pressure side PS surface 112 of the airfoil 110.

The turbine blade 100 comprises the blade cavity 160 therein. The cooling medium may enter the cooling passage 170 through the blade cavity 160.

Figure 4:
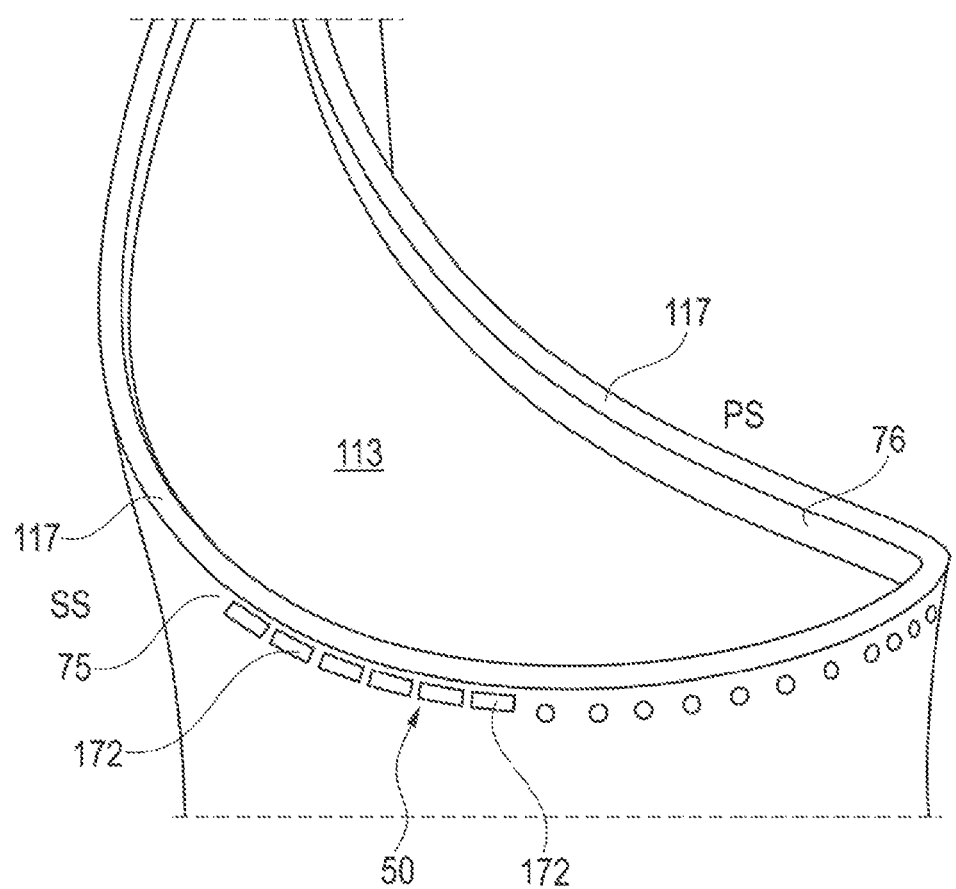
FIG. 4 shows a schematic illustration of an embodiment of an airfoil for the turbine blade with the squealer tip cooling system provided at a suction side according to the present invention.

FIG. 4 shows a schematic illustration of an embodiment of an airfoil for the turbine blade with the squealer tip cooling system provided at a suction side according to the present invention.

The airfoil of FIG. 4 comprises a plurality of the squealer tip cooling system 50 at least partly at the suction side surface SS of the airfoil 110. Therefore, an efficient cooling of the squealer tip 117 may be realized.

Figure 5:
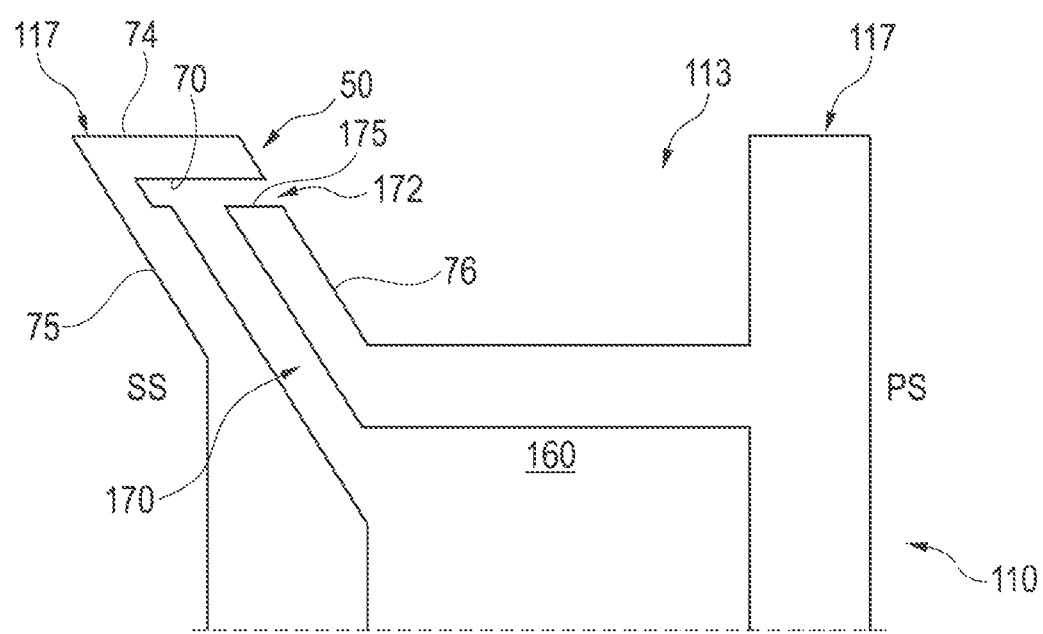
FIG. 5 shows a schematic cross-sectional illustration of an embodiment of the airfoil with the squealer tip cooling system provided at a blade tip according to the present invention.

FIG. 5 shows a schematic cross-sectional illustration of an embodiment of the airfoil with the squealer tip cooling system provided at a blade tip according to the present patent invention.

FIG. 5 is based on FIG. 3 with the difference that the pocket 172 is provided at an inner lateral surface 76, instead of at the outer lateral surface 75, of the squealer tip, open inwardly of the airfoil 110. In other words, the cooling medium may exit the pocket 172 on an opposite side of the suction side surface 111.

Figure 6:
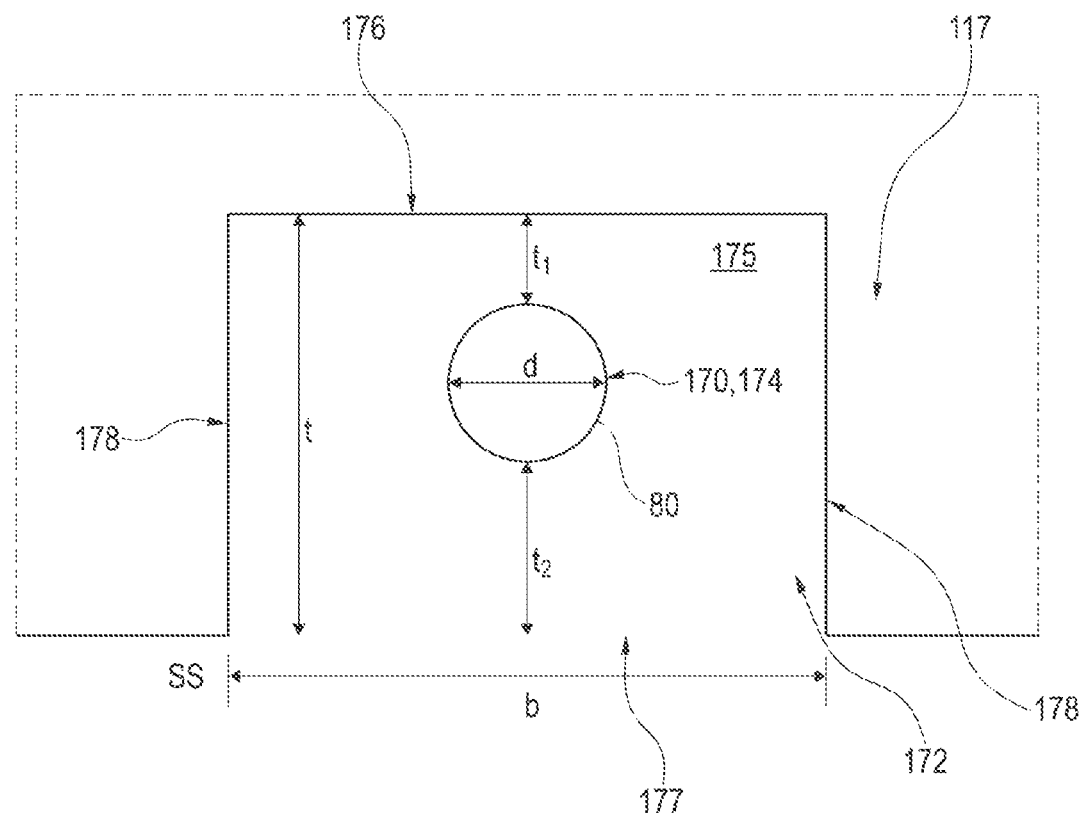
FIG. 6 shows a schematic cross-sectional illustration of an embodiment of a pocket of the squealer tip cooling system according to the present invention.

FIG. 6 shows a schematic cross-sectional illustration of an embodiment of a pocket of the squealer tip cooling system according to the present invention.

FIG. 6 is an exemplary depiction of a cross-section along the dotted A-A line of FIG. 3. FIG. 6 is a schematic top view illustration of the pocket 172 provided on the suction side SS of the squealer tip 117. The pocket 172 may be a recess, an open cavity, a slot, or a hole with a back surface 176 opposite to an opening 177 of the pocket 172. The cooling passage 170 intersects with the bottom surface 175 of the pocket 172.

That is that the bottom surface 175 of the pocket 172 and the outlet 174 of the cooling passage 170 may have the intersection 80 in common. Lateral surfaces 178 which extend from the opening 177 of the pocket 172 in the direction to the back surface 176 may define a depth t of the pocket 172. A distance between the lateral surfaces 178 is a width b of the pocket 172. The width b may also be understood as the distance between two lateral surfaces of the pocket 172 that face each other in a direction substantially parallel to an extension of the pocket 172 running parallel to the terminal end 74 of the squealer tip 117. In this context it should be understood that other similar geometric forms of the pocket 172 are also in the scope of the present invention.

To provide a sufficient impingement surface 70 and thereby a good heat transfer ratio, the width b can be 3 to 8 times bigger than the hydraulic diameter d according to an embodiment. Preferably, the width b may be between 3 to 7 times bigger than the hydraulic diameter d. Most preferably, the width b may be between 3 to 6 times bigger than the hydraulic diameter d.

The distance between the opening 177 and the back surface 176 is the depth t of the pocket 172. To provide a sufficient impingement surface 70 and thereby a good heat transfer ratio, the depth t may be between 2 and 5 times bigger than the hydraulic diameter d according to an embodiment. Preferably the depth t may be between 2 and 4.5 times bigger than the hydraulic diameter d. Most preferably, the depth t may be between 2 and 4 times bigger the hydraulic diameter d.

The shortest distance between the back surface 176 of the pocket 172 and the outlet 174 of the cooling passage 170 may be defined as a distance t1.

The shortest distance between the opening 177 of the pocket 172 and the outlet 174 of the cooling passage 170 may be defined as a distance t2.

According to an embodiment, the distance t1 and the distance t2 may be at least bigger than the hydraulic diameter d. Preferably the distance t1 and/or the distance t2 may be 1.5 times bigger than the hydraulic diameter d. Most preferably the distance t1 and/or the distance t2 may be at least two times bigger than the hydraulic diameter.

To achieve an efficient impingement cooling at the impingement surface 70 a combination of the preferred or the most preferred dimension ranges of the pocket 172 with respect to the hydraulic diameter d may be conducted. Preferably, the pocket 172 may have a larger spatial expansion than the outlet 174 of the cooling passage 170 according to an embodiment.

FIGS. 7A-7D show schematic three-dimensional illustrations of exemplary embodiments of various pocket forms according to the present invention. However, the pocket forms are not limited to these examples.

Figure 7A:
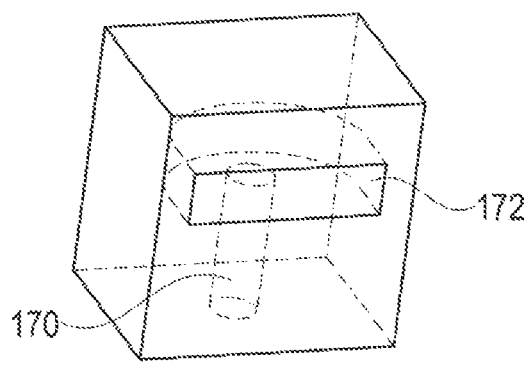
FIGS. 7A-7D show schematic three-dimensional illustrations of embodiments of various pocket forms according to the present invention.
Figure 7B:
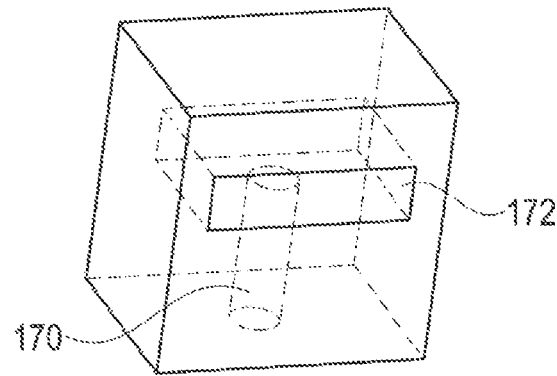
Figure 7C:
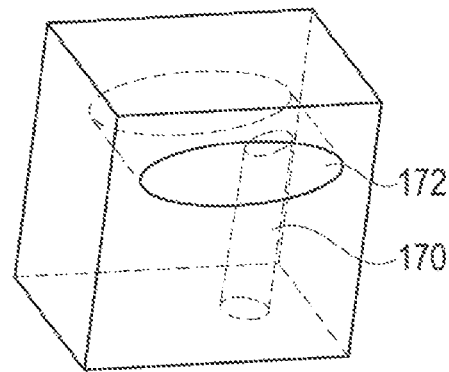
Figure 7D:
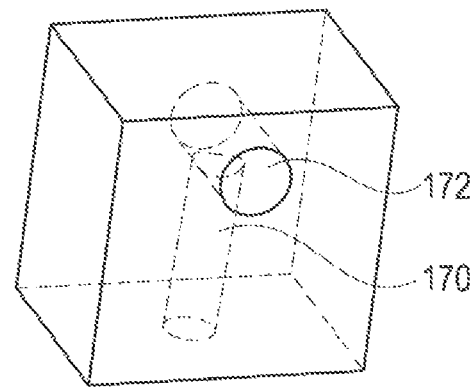

As shown in FIG. 7A the pocket 172 may have at least partly a semicircular shape. As shown in FIG. 7B the pocket 172 may have at least partly a rectangular shape. As shown in FIG. 7C the pocket 172 may have at least partly an elliptical shape. As shown in FIG. 7D the pocket 172 may have at least partly a circular shape. Preferably, the pocket 172 may have a larger spatial expansion than the outlet 174 of the cooling passage 170.

In this context it should be understood that other various geometric forms of the pocket that are in a form of open cavity and intersect with cooling passage 170 are in the scope of the present invention.

Figure 8A:
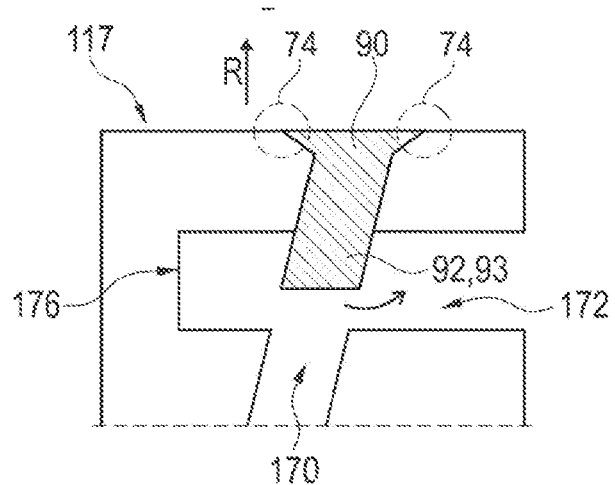
FIGS. 8A-8B show schematic cross-sectional illustrations of an embodiment of a squealer tip cooling system with a cooling channel, wherein a terminal end of the squealer tip is sealed by a sealing element according to the present invention.
Figure 8B:
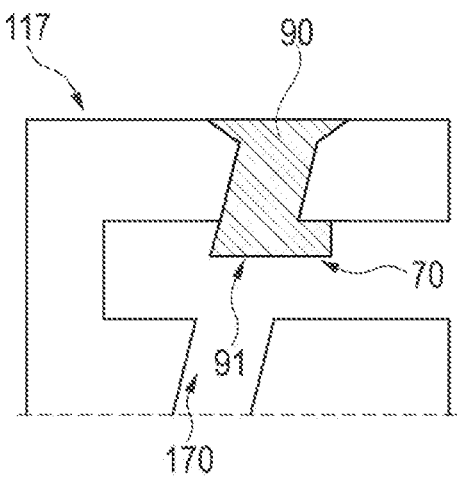

FIGS. 8A-8B shows schematic cross-sectional illustrations of embodiments of a squealer tip cooling system with a cooling channel, wherein a terminal end of the squealer tip is sealed by a sealing element according to the present invention.

According to an embodiment, the cooling passage 170 may extend up to the terminal end 74 of the squealer tip 117 to be opened outside in a radially outward direction R, wherein the cooling passage 170 runs at least partly through the pocket 172, and wherein the impingement surface 70 comprises at least partly a sealing element 90 configured to seal the cooling passage 170 at the terminal end 74 of the squealer tip 117.

According to FIG. 8A, the sealing element 90 may comprise an inelastic end 92, wherein the inelastic end 92 comprises a single fixing mean 93. The sealing element 90 may be a locking element, a closing element, or a plug. In this exemplary embodiment, the inelastic end 92 is inelastic in a sense that the single fixing mean 93 may be bent in an irreversible manner in one direction as indicated by an arrow in FIG. 8A.

As shown in FIG. 8A the terminal end 74 of the squealer tip 117 may be at least partly machined (indicated by dotted circles). For example, the terminal end 74 may be drilled out such that an insertion of the sealing element 90 may be facilitated.

As shown in FIG. 8B a bottom surface 91 of the bent inelastic end 92 of the sealing element 90 may at least partly function as the impingement surface 70.

Alternatively, or in addition the sealing element 90 may be brazed or welded into the terminal end 74 of the squealer tip 117. The sealing element 90 may also be a bended wire plug which may be bent into the terminal end 74 of the squealer tip 117.

Figure 9A:
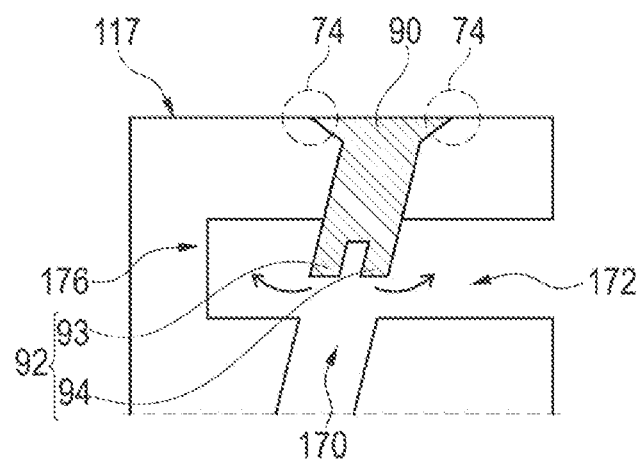
FIGS. 9A-9B show schematic cross-sectional illustrations of another embodiment of a squealer tip cooling system with a cooling channel, wherein a terminal end of the squealer tip is sealed by a sealing element according to the present invention.
Figure 9B:
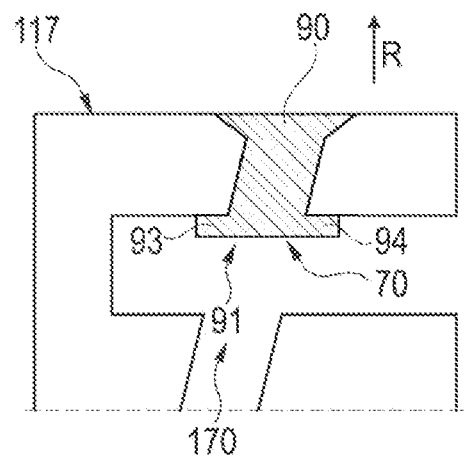

FIGS. 9A-9B shows schematic cross-sectional illustrations of another embodiment of a squealer tip cooling system with a cooling channel, wherein a terminal end of the squealer tip is sealed by a sealing element according to the present invention.

According to FIG. 9A, the sealing element 90 may comprise an inelastic end 92, wherein the inelastic end 92 comprises two fixing means 93, 94 spaced apart from each other.

In this exemplary embodiment, the inelastic end 92 is inelastic in a sense that the two fixing means 93, 94 may be bent in an irreversible manner in two opposed directions as indicated by the two arrows in FIG. 9A.

FIGS. 8A and 8B and FIGS. 9A and 9B illustrates sealing element 90 which may close the terminal end 74 of the squealer tip 117 by means of interlocking for positive form locking. According to embodiments, other means of closing may be to braze or weld the sealing element 90 creating an adhesive bond or material closure. In addition, in case of welding, the terminal end 74 of the squealer tip 117 may be closed exclusively by welding without using the sealing element 90.

As shown in FIG. 9A the terminal end 74 of the squealer tip 117 may be at least partly machined (indicated by dotted circles). For example, the terminal end may be drilled out such that an insertion of the sealing element may be facilitated.

As shown in FIG. 9B the bottom surface 91 of the bent inelastic end 92 may at least partly function as the impingement surface 70.

Figure 10A:
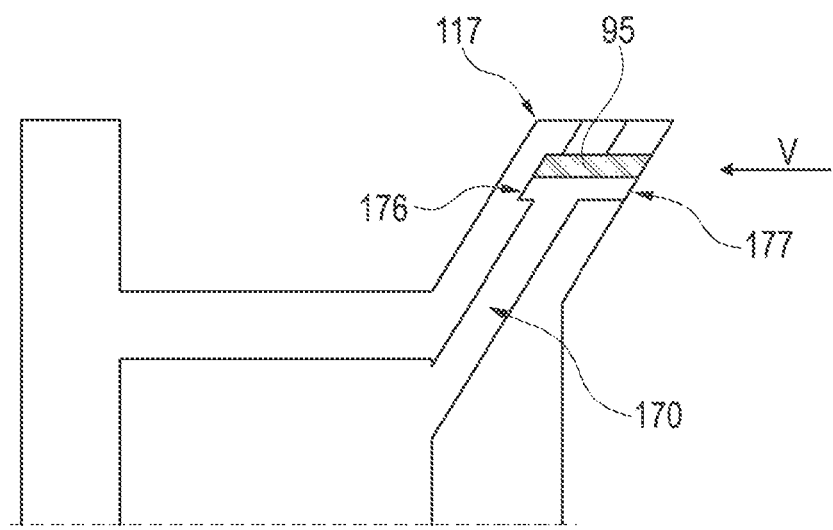
FIG. 10A shows schematic cross-sectional illustrations of another embodiment of a squealer tip cooling system with a cooling channel, wherein a pocket of the cooling channel is sealed by a sealing element according to the present invention.

FIG. 10A shows a schematic cross-sectional illustration of another embodiment of a squealer tip cooling system with a cooling channel, wherein a pocket of the cooling channel is sealed by a sealing element according to the present invention.

Figure 10B:
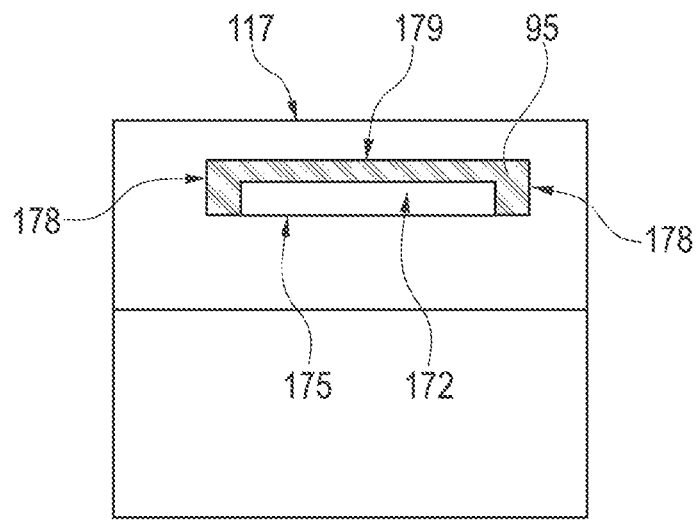
FIG. 10B shows a schematic plan view of the squealer tip cooling system of an embodiment of FIG. 10A, from a direction V indicated by an arrow.

FIG. 10B shows a schematic plane view of the squealer tip cooling system of an embodiment of FIG. 10A from a direction V indicated by an arrow.

According to FIGS. 10A and 10B, the sealing element 90 may be a plug insert 95 which may be inserted into the pocket 172. The plug insert 95 may be in direct contact with the back surface 176, the lateral surfaces 178 and an upper surface 179 of the pocket 172 such that the cooling medium exclusively exits the pocket 172 via the opening 177. The upper surface 179 of the pocket 172 faces the bottom surface 175 of the pocket 172.

Figure 11:
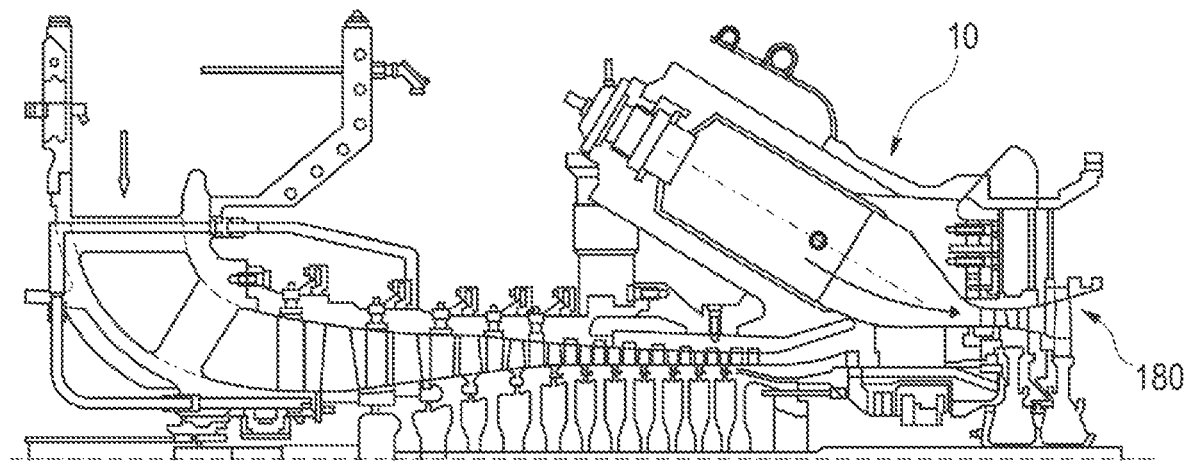
FIG. 11 show a schematic sectional view of a part of an embodiment of a gas turbine in which an embodiment of the turbine blade comprising the airfoil with the squealer tip cooling system may be incorporated.

FIG. 11 shows a schematic sectional view of a part of an embodiment of a gas turbine which may incorporate the turbine blade assembly comprising the airfoil with the squealer tip cooling system according to embodiments of the present invention.

As shown in FIG. 11 the gas turbine 10 may comprise the turbine blade assembly 180 described herein.

Figure 12:
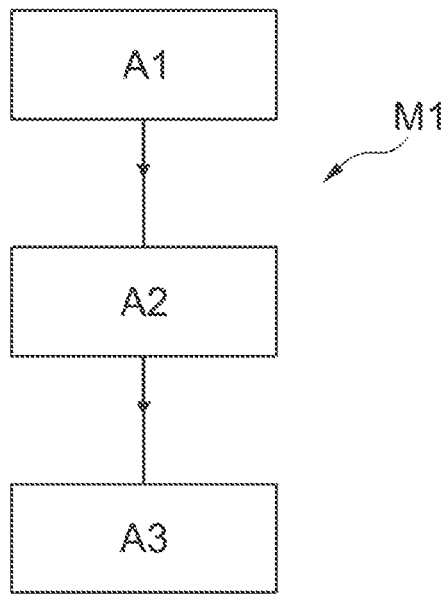
FIG. 12 shows a schematic flow diagram of an embodiment of a manufacturing method according to the present invention.

FIG. 12 shows a schematic flow diagram of an embodiment of a manufacturing method according to the present invention.

The manufacturing method M1 of the airfoil 110 with the squealer tip cooling system 50 comprises steps A1, A2 and A3.

In step A1 at least a part of the cooling passage 170 is allocated within the blade tip 113 of the airfoil 110.

In step A2 the remaining part of the cooling passage 170 is provided such that the cooling passage 170 at least partly extends within the squealer tip 117 toward the terminal end 74 of the squealer tip 117.

And in step A3 the pocket 172 at the lateral surface 75 or the lateral surface 76 of the squealer tip 117 is provided such that the pocket 172 intersects the cooling passage 170, wherein the pocket 172 comprises an impingement surface 70 facing the cooling passage 170, such that a cooling medium expelled through the cooling passage 170 impinges on the impingement surface 70 before being discharged externally through the pocket 172.

Figure 13:
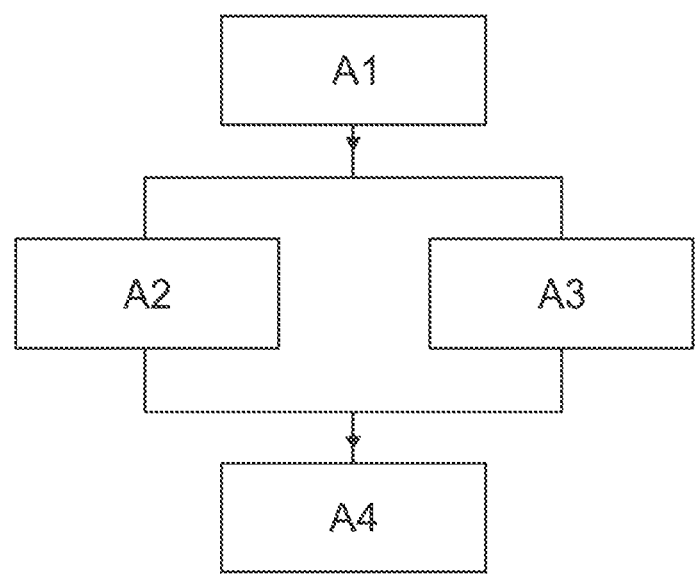
FIG. 13 shows a schematic flow diagram of another embodiment of a manufacturing method according to the present invention.

FIG. 13 shows a schematic flow diagram of another embodiment of a manufacturing method according to the present invention.

In an alternative embodiment of the manufacturing method described herein, the steps A2 and A3 as described in FIG. 12 are conducted by means of additive manufacturing and the manufacturing method further comprises a step A4. In step 4, the squealer tip 117 manufactured in steps A2 and A3 is aligned on the blade tip 113 manufactured in step A1 as described in FIG. 12 to provide the squealer tip cooling system 50.

In a further alternative embodiment, the squealer tip cooling system 50 with the blade tip 113 may be manufactured by means of the additive manufacturing in its entirety, thereby an alignment of the corresponding cooling passages 170 and an adjustment on the blade tip 113 (i.e., the Step 4 as described in FIG. 13) is not necessary.

The features described herein with respect to embodiments of the airfoil with the squealer tip cooling system may be used to understand the manufacturing method of the embodiments of the corresponding airfoil with the squealer tip cooling system, and vice versa.

Although specific embodiments have been illustrated and described herein, it will be appreciated by those of the ordinary skill in the art that a variety of alternate and/or equivalent implementations exist. It should also be appreciated that the exemplary embodiment or exemplary embodiments are only examples, and are not intended to limit the scope, applicability, or configuration in any way.

Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS 10 gas turbine
50 squealer tip cooling system
70 impingement surface
74 terminal end of the squealer tip
75 outer lateral surface of the squealer tip
76 inner lateral surface of the squealer tip
80 intersection
90 sealing element
91 bottom surface of the sealing element
92 inelastic end
93, 94 fixing mean
95 plug insert
100 turbine blade
110 airfoil
111 suction side surface
112 pressure side surface
113 blade tip
114 leading edge
115 trailing edge
117 squealer tip
118 stator surface
120 platform
140 rotor disk
150 shaft
160 blade cavity
170 cooling passage
171 plug
172 pocket
173 inlet
174 outlet
175 bottom surface
176 back surface
177 opening
178 lateral surfaces
179 upper surface
180 turbine blade assembly
b width
d hydraulic diameter
h height
t depth
t1, t2 distance
y1, y2 radial clearance
R radially outward direction
SS suction side
PS pressure side
V direction

The invention claimed is:

1. A turbine blade comprising:
an airfoil with a squealer tip cooling system provided at a blade tip of the turbine blade, wherein the squealer tip cooling system comprises:
a cooling passage arranged within a squealer tip of the turbine blade, wherein the cooling passage at least partly extends toward a terminal end of the squealer tip; and
a pocket provided at a lateral surface of the squealer tip, and comprising an opening open toward the lateral surface; a space extending inwardly from the opening to a back surface opposite to the opening at least partly across the cooling passage; and side surfaces facing each other and extending from the opening in a direction to the back surface, wherein the pocket intersects the cooling passage and includes an impingement surface facing the cooling passage, on which a cooling medium expelled through the cooling passage impinges before being discharged externally through the pocket.

2. The turbine blade according to claim 1, wherein the pocket has a larger spatial expansion than an outlet of the cooling passage.

3. The turbine blade according to claim 1, wherein the pocket has at least partly a rectangular, a semicircular, an elliptical or a circular shape, and wherein the impingement surface is located opposite to the cooling passage.

4. The turbine blade according to claim 1, wherein the pocket is provided at an outer lateral surface of the squealer tip, open outwardly of the airfoil.

5. The turbine blade according to claim 1, wherein the pocket is provided at an inner lateral surface of the squealer tip, open inwardly of the airfoil.

6. The turbine blade according to claim 1, wherein an intersection of the pocket and the cooling passage is positioned away from boundaries of the pocket.

7. The turbine blade according to claim 1, wherein the cooling passage extends obliquely with respect to the suction side surface and/or pressure side surface of the airfoil.

8. The turbine blade according to claim 1, wherein the cooling passage extends up to the terminal end of the squealer tip to be opened, wherein the cooling passage runs at least partly through the pocket, and wherein the impingement surface comprises at least partly a sealing element configured to seal the cooling passage.

9. The turbine blade according to claim 8, wherein the sealing element is brazed or welded into the terminal end of the squealer tip.

10. The turbine blade according to claim 8, wherein the sealing element comprises an inelastic end with a single fixing mean or plurality of fixing means spaced apart from each other, wherein a bent inelastic end of the sealing element locking the sealing element with the pocket protrudes from an upper surface of the pocket.

11. The turbine blade according to claim 1, wherein the turbine blade further comprises a blade cavity in the turbine blade, and the cooling medium enters the cooling passage through the blade cavity.

12. A gas turbine comprising:
a plurality of turbine blades;
a rotor disk to which said plurality of turbine blades is couple, wherein a turbine blade from among the plurality of turbine blades comprises an airfoil with a squealer tip cooling system provided at a blade tip of the turbine blade, wherein the squealer tip cooling system comprises:
a cooling passage arranged within a squealer tip of the turbine blade, wherein the cooling passage at least partly extends toward a terminal end of the squealer tip; and a pocket provided at a lateral surface of the squealer tip, and comprising an opening open toward the lateral surface; a space extending inwardly from the opening to a back surface opposite to the opening at least partly across the cooling passage; and side surfaces facing each other and extending from the opening in a direction to the back surface, wherein the pocket intersects the cooling passage and includes an impingement surface facing the cooling passage, on which a cooling medium expelled through the cooling passage impinges before being discharged externally through the pocket.

13. The gas turbine according to claim 12, wherein the pocket has a larger spatial expansion than an outlet of the cooling passage.

14. The gas turbine according to claim 12, wherein the pocket has at least partly a rectangular, a semicircular, an elliptical or a circular shape, and wherein the impingement surface is located opposite to the cooling passage.

15. The gas turbine according to claim 12, wherein the pocket is provided at an outer lateral surface of the squealer tip, open outwardly of the airfoil.

16. The gas turbine according to claim 12, wherein the pocket is provided at an inner lateral surface of the squealer tip, open inwardly of the airfoil.

17. The gas turbine according to claim 12, wherein an intersection of the pocket and the cooling passage is positioned away from boundaries of the pocket.

18. The gas turbine according to claim 12, wherein the turbine blade further comprises a blade cavity and the cooling medium enters the cooling passage through the blade cavity.

* * * * *